United States Patent [19]

Williamson

[11] Patent Number: 4,501,229

[45] Date of Patent: Feb. 26, 1985

[54] AUTOMATIC ANIMAL-FEEDING DEVICE

[76] Inventor: Robert L. Williamson, 15155 El Soneto, Whittier, Calif. 90603

[21] Appl. No.: 540,139

[22] Filed: Oct. 7, 1983

[51] Int. Cl.³ ............................................. A01K 5/02
[52] U.S. Cl. .................................................. 119/51.12
[58] Field of Search .............. 119/51.11, 51.12, 51.13, 119/51.14, 51.15, 51.5

[56] References Cited

U.S. PATENT DOCUMENTS

| 3,826,231 | 7/1974 | Crawford et al. | 119/51.12 |
| 4,248,175 | 2/1981 | Navarro | 119/51.12 |
| 4,249,483 | 2/1981 | Sobky | 119/51.12 |
| 4,421,059 | 12/1983 | Cousino | 119/51.12 |

FOREIGN PATENT DOCUMENTS

| 1546638 | 5/1979 | United Kingdom | 119/51.12 |
| 2037140 | 7/1980 | United Kingdom | 119/51.11 |

*Primary Examiner*—John J. Wilson
*Assistant Examiner*—Kris R. Schulze
*Attorney, Agent, or Firm*—Francis X. LoJacono

[57] ABSTRACT

The present invention is directed to an automatic animal-feeding device adapted to be selectively controlled for dispensing measured amounts of food at pre-selected time intervals. The device includes a base-support member having a rotatable tray which is provided with a plurality of food compartments, the tray being mounted on a central drive which is defined by a fixed hub having a driven rotatable cap member placed under a continuous load by means of a spring drive. The tray is releasably held in place by a latch mechanism actuated by a programmable timing device which is adapted to be selectively set for the controlled dispensing of food contained in the individual compartments. A hinged cover is included having an aperture through which food is released as each compartment is positioned thereunder at the pre-selected time.

2 Claims, 4 Drawing Figures

AUTOMATIC ANIMAL-FEEDING DEVICE

BACKGROUND OF THE INVENTION

1. Field of the Invention

This invention relates generally to an animal feeder, and more particularly to an automatic animal-feeding device having a plurality of individual food compartments to be provided with measured amounts of food for dispensing at pre-selected time intervals by use of a programmable timing device.

2. Description of the Prior Art

Various problems and difficulties have been encountered in providing suitable feeding means for animals, particularly for domesticated pets and for commercially-raised animals. Under most feeding conditions animals are supplied with various amounts of food that is generally placed in open containers or dishes and left at the disposal of the animals with no control over when or how much they are allowed to eat.

A variety of animal-feeding devices have been developed over the years which supply food to pets and other animals in a somewhat automated fashion for the convenience of pet owners and animal keepers, and to improve the efficiency of commercial animal raising operations.

As an example, some feeders provide a container or a tube connected to an open dish. The food moves by gravity down the tube or container into the open dish without any control over the time dispensed or the amount available.

Another type of feeder provides a dish with a hinged cover that is activated by an animal's weight. When the animal steps on a platform, the cover moves and exposes the stored food. Again, there is no control over the number of times at which the food is dispensed or the amounts of food available.

Other prior-art feeding devices are disclosed in the following United States patents:

U.S. Pat. No. 3,050,029 merely dispenses dry food into a convenient feeding receptacle or location external to the dispenser itself.

U.S. Pat. No. 2,791,984 discloses a device for dispensing both dry and liquid food form a refrigerated storage compartment.

The device of U.S. Pat. No. 4,249,483 provides both types of food from sealed storage compartments which require no refrigeration to preserve the food.

In U.S. Pat. No. 3,826,231 the apparatus described is a rotating tray designed primarily for dry food.

While these earlier developed feeders are very similar in their intent and mode of operation, there are great differences in their complexity, reliability, convenience, and food-packaging requirements which are reflected in manufacturing costs and marketing features.

SUMMARY AND OBJECTS OF THE INVENTION

The automatic-feeding apparatus of the present invention is a simplified, low-cost unit which accomplishes the objectives of reliable, programmed feeding of pets and other animals. It is assembled with a minimum number of parts which are easily formed and therefore of low-manufacturing cost. Since there are readily available water dispensers, there is no need to provide moisture protection for the food so that relatively inexpensive and easily stored dry food from bulk containers can be used to stock the feeder. The integral feeding tray is easy to remove and clean and the unit is easily programmed to set up any desired feeding schedule. The unit is designed to operate on very low voltage, and when supplied with batteries is entirely self contained and quite safe electrically.

Accordingly, it is an object of this invention to improve automatic animal feeders by making a structure that is easy to manufacture and, by virtue of its simplicity, will be extremely reliable.

A further object of this invention is to provide a protected, but easily accessible, programmable timer for setting up the feeding schedule, and to provide a feeding tray that is easy to clean and to load for feeding, thereby making the device very simple to use.

Still another object of this invention is to provide a self-contained unit that does not have to be located near a power source, which would require precautions around unattended animals.

A still further object of the present invention is to provide an automatic animal feeder that includes a simple spring-operated drive mechanism having a fixed hub with a rotatable cap driven by a spring, the cap being arranged to engage and rotate the food tray which is selectively released for rotation by a releasable latching lever which itself is actuated by a solenoid.

Another object of the invention is to provide a relatively simple mechanical animal-feeding device that includes a rotatable tray having a plurality of food compartments for dispensing a variety of individual meals which are pre-measured and exposed at pre-selected times.

It is a further object of the invention to provide a device of this character having relatively few operating parts.

A still further object of the invention is to provide a feeder of this character that is easy to service and to maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

All of the foregoing and still further objects and advantages of this invention will become apparent from a study of the following specification, taken in conjunction with the accompanying drawings, wherein.

DESCRIPTION OF THE PREFERRED EMBODIMENT

Figure 1:
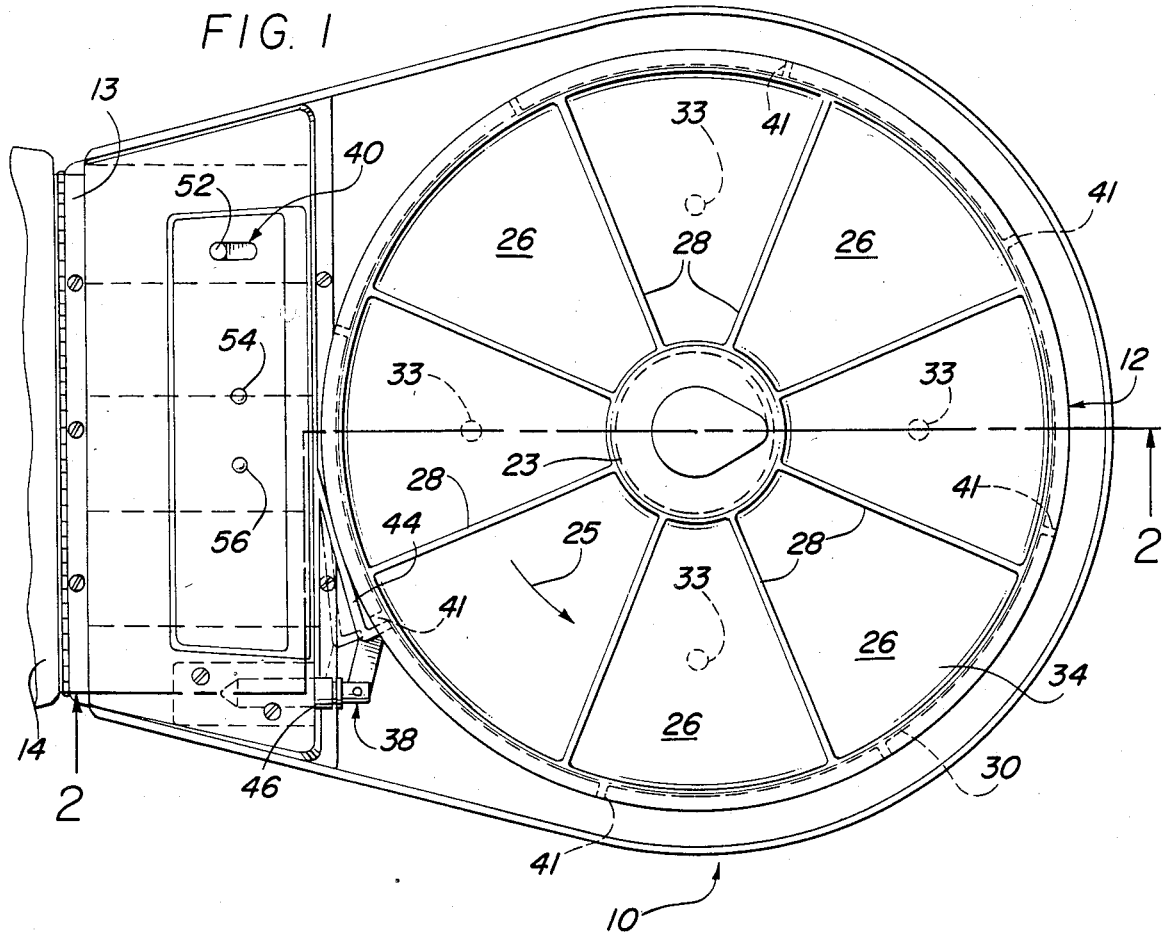
FIG. 1 is a top-plan view of the apparatus with the cover fully open showing the rotatable food tray, the tray-actuating solenoid, and the timer-control panel.
Figure 2:
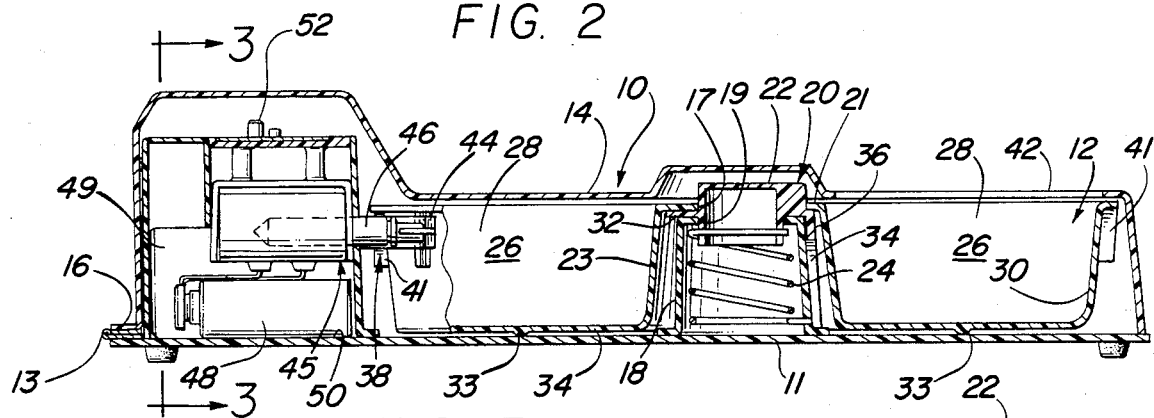
FIG. 2 is a cross-section of the feeder taken substantially along line 2—2 of FIG. 1 showing the cover in the closed or operating position, the rotating food-tray hub and drive spring, the tray-actuating solenoid, and the battery compartments.
Figure 3:
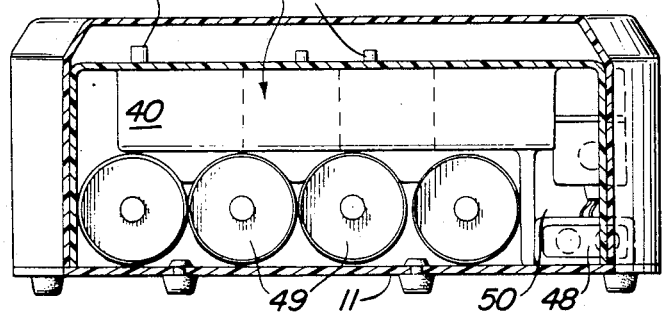
FIG. 3 is a cross-sectional view taken substantially along line 3—3 of FIG. 2 showing the timer compartment and the battery storage.
Figure 4:
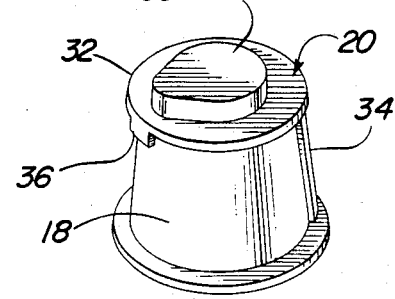
FIG. 4 is a perspective view of the fixed hub and rotatable cap, rotating stop, and tray-positioning cam.

The operation of the apparatus can best be understood by referring to the drawings, and more particularly to FIGS. 1 and 2. There is illustrated therein an animal-feeding device, designated generally at 10, which comprises a base member 11 adapted to support a rotatable food tray 12, both the base member and the food tray being enclosed by a hinged cover 14 which is attached to the base member by a suitable hinge 13 along the rear edge of the base and a cover flange 16. Fixedly mounted to base member 11 is a tray-drive means defined by a non-rotating hub 18 which is positioned coaxially with the round portion of the base. Hub 18 is formed with a central opening 19 therein adapted to receive a rotatable cap member 20 which is supported by an annular bearing flange 21. Cap member 20 is formed with an irregular-shaped boss member 22 adapted to be received in and to protrude through a matching aperture 17 disposed in the central coaxial hub 23 of tray 12, as seen in FIG. 2. Thus, as cap 20 is rotated by means of spring 24, tray 12 is rotated therewith in the same direction, that direction being generally counter-clockwise as indicated by arrow 25.

Accordingly, food tray 12 contains a plurality of circumferentially arranged compartments 26 that are defined by radially extended partitions 28 interposed between the annular wall of hub 23 and the outer annular wall 30 of tray 12. As can be seen in FIG. 2, hub 23 of tray 12 is superposed over the centrally fixed hub 18 of base 11, the tray being supported on the annular flange 32 of cap 20. A plurality of spaced projecting bosses 33 are formed on the bottom wall 34 of the tray, to provide bearing support if the tray becomes unbalanced during rotation.

Hence, tray 12 is placed under rotational force by rotating cap 20 so as to wind spring 24 which is secured at one end to the fixed hub 18 and at the opposite end to cap 20. Limit means is also provided to limit the rotation of cap 20 to one full revolution of approximately 360°, thus in turn allowing tray 12 to rotate 360° about the central axis of hub 18. The rotational limit means comprises a stop member 34 formed on fixed hub 18 and a downwardly projecting tongue member 36 formed on cap 20, whereby spring 24 is loaded by the rotating cap in a clockwise direction until the tongue engages stop member 34. As tray 12 is sequentially released by a latching means 38 controlled by a timing means 40, tongue 36 will move about fixed hub 18 until it again engages stop member 34—that is, the tongue rotates one revolution. It should be noted that spring 24 is preloaded so that it is always urging tray 12 to rotate in a counter-clockwise direction (when viewed from the top). The amount of preload is such that the additional spring-loading generated by rotating the food tray through one full turn is a small percentage of the total spring force, so that the spring is in effect a constant torque at any position of the tray 30, yet it is impossible to overload spring 24 by normal use of the feeder.

The incremental rotary motion of tray 12 is controlled by latching means 38 which is defined by a plurality of ear members 41 formed around the periphery of annular wall 30, there being one ear for each segmented compartment 26 to allow the tray to rotate sequentially, so that each compartment having food disposed therein is incrementally exposed through an aperture 42 formed in cover 14, as seen in FIG. 2.

Hence, the tray is releasably held in place by a biased latch arm 44 that is interconnected to a solenoid 45 by means of solenoid plunger 46 which is connected to latch arm 44, whereby the latch arm is pulled away from ear 41 as the solenoid is activated by the timing means 40. Latch arm 44 can be biased in a latching mode by any suitable means; however, the present device is formed from a flexible plastic material which, when in a normal position, is latched against one of the ear members 41 to inhibit the rotational movement of the tray in a counter-clockwise direction (arrow 25). A current pulse to solenoid 45 pulls latch arm 44 away from ear 41 momentarily, so that tray 12 rotates counter-clockwise toward the following ear member 41, allowing a succeeding food compartment to be exposed through aperture 42. The current pulse lasts only long enough for latch arm 44 to clear ear 41 and then spring back into engagement with the next ear member.

The activation of solenoid 45 is provided by timing means 40 which can be any mechanical timer, but preferably a suitable electronic control capable of being operated by a power supply such as a 9 to 12 volt battery, or batteries, as at 48 located in compartment 50. Switch 52 sets the cycle at which the food compartments are advanced, the switch having an "OFF" position, a 12-hour position, and a 24-hour position. When the switch is set for 12 hours, the solenoid is activated every 12 hours whereby two different compartments are exposed to allow the animal to eat twice during a 24-hour period. Hence, the tray moves one compartment every 24 hours, when switch 52 is positioned for a 24-hour cycle. Prior to setting up the animal feeder, the drive and timer batteries can be tested under load by means of battery-test means 54.

Accordingly, cover 14 is opened as indicated in FIG. 1, the food compartments are loaded with food, and tray 12 is fully rotated in a clockwise direction until tongue 36 engages stop 34. At this time, timer switch 52 is set and the start button 56 is pushed. Cover 12 is again closed, leaving one compartment of food exposed. The tray will sequentially rotate as the setting indicates.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An animal-feeding apparatus comprising:
   a base-support member;
   a cover removably mounted on said base-support member and having an aperture formed therein;
   a food tray having a central hub member and an outer annular wall, said hub member having an opening therein;
   a plurality of circumferentially disposed food compartments interposed between said central hub and said outer wall of said food tray, whereby said compartments are arranged to be sequentially positioned under said aperture in said cover;
   a tray-drive means comprising a fixed central hub member secured to said base-support member, a cap member rotatably mounted in said fixed hub member for limited movement thereon and adapted to be coupled to said food tray, whereby said food tray rotates therewith, and means disposed in said fixed hub member to rotate said cap member;

wherein said fixed central hub member includes a central opening adapted to rotatably receive said cap member therein, said cap member being formed having an irregular-shaped boss member adapted to be received in a matching opening formed in said central hub of said food tray, whereby said food tray is rotated with said cap;

means formed between said cap member and said fixed hub member to limit the rotation of said cap member;

wherein said limit means comprises a stop member formed on said fixed hub member, and a depending tongue member formed on said cap member positioned to engage said stop member, whereby said cap member is restricted to one revolution;

releasable latching means arranged to engage said food tray for sequential positioning of said food compartments under said cover aperture;

wherein said latching means comprises a biased latching arm, a plurality of ear members formed on said annular wall of said food tray arranged to be engaged by said latching arm, and a solenoid attached to said latching arm whereby said latching arm is sequentially disengaged from said ear member to allow said tray to selectively rotate for repositioning of said food compartments;

timing means connected to said releasable latching means for sequentially activating said latching means; and power-supply means adapted to activate said releasable latching means and said timing means.

2. An animal-feeding apparatus as recited in claim 1, wherein said rotating means comprises a coil spring connected between said fixed hub and said cap member.

* * * * *